US008188906B2

(12) United States Patent
Mizutani et al.

(10) Patent No.: US 8,188,906 B2
(45) Date of Patent: May 29, 2012

(54) WEATHER RADAR APPARATUS AND RAINFALL RATE CALCULATION METHOD

(75) Inventors: Fumihiko Mizutani, Kawasaki (JP); Masakazu Wada, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 123 days.

(21) Appl. No.: 12/825,819

(22) Filed: Jun. 29, 2010

(65) Prior Publication Data
US 2011/0018757 A1 Jan. 27, 2011

(30) Foreign Application Priority Data

| Jul. 24, 2009 | (JP) | 2009-173519 |
| Aug. 25, 2009 | (JP) | 2009-194548 |
| Aug. 26, 2009 | (JP) | 2009-195370 |
| Aug. 26, 2009 | (JP) | 2009-195371 |
| Aug. 26, 2009 | (JP) | 2009-195372 |

(51) Int. Cl.
*G01S 13/00* (2006.01)

(52) U.S. Cl. .................. 342/26 R; 342/26 A; 342/26 B; 342/26 C; 342/26 D

(58) Field of Classification Search ................. 342/26 R, 342/26 A, 26 B, 26 C, 26 D
See application file for complete search history.

(56) References Cited

U.S. PATENT DOCUMENTS

| 5,500,646 | A * | 3/1996 | Zrnic | 342/188 |
| 6,061,013 | A * | 5/2000 | Sauvageot et al. | 342/26 R |
| 6,456,227 | B2 * | 9/2002 | Wada et al. | 342/26 R |
| 6,473,026 | B1 * | 10/2002 | Ali-Mehenni et al. | 342/26 R |
| 6,581,009 | B1 * | 6/2003 | Smith | 702/3 |
| 7,158,071 | B2 * | 1/2007 | Testud et al. | 342/25 R |
| 7,417,577 | B2 * | 8/2008 | Testud et al. | 342/26 R |
| 8,009,080 | B2 * | 8/2011 | Mizutani et al. | 342/26 R |
| 2004/0056791 | A1 * | 3/2004 | Alford et al. | 342/26 |
| 2004/0201515 | A1 * | 10/2004 | Testud et al. | 342/26 R |
| 2004/0203730 | A1 * | 10/2004 | Fraser et al. | 455/426.1 |
| 2005/0093734 | A1 * | 5/2005 | Alford et al. | 342/26 R |
| 2005/0203730 | A1 | 9/2005 | Aoki et al. | |
| 2007/0103359 | A1 * | 5/2007 | Testud et al. | 342/26 R |
| 2007/0152867 | A1 | 7/2007 | Randall | |
| 2008/0165052 | A1 * | 7/2008 | Andersson et al. | 342/26 R |
| 2009/0160700 | A1 * | 6/2009 | Messer-Yaron et al. | 342/26 R |
| 2009/0295627 | A1 * | 12/2009 | Venkatachalam et al. | 342/26 R |
| 2009/0315762 | A1 * | 12/2009 | Venkatachalam et al. | 342/26 R |
| 2011/0018757 | A1 * | 1/2011 | Mizutani et al. | 342/26 R |

OTHER PUBLICATIONS

U.S. Appl. No. 12/700,209, filed Feb. 4, 2010, Fumihiko Mizutani et al.

(Continued)

*Primary Examiner* — Thomas Tarcza
*Assistant Examiner* — Peter Bythrow
(74) *Attorney, Agent, or Firm* — Oblon, Spivak, McClelland, Maier & Neustadt, L.L.P.

(57) ABSTRACT

According to one embodiment, a weather radar apparatus includes a transmitting/receiving unit configured to simultaneously transmit radar waves of a horizontally polarized wave and a vertically polarized wave and receive reflected waves, a signal processing unit configured to perform dual polarization observation based on a reception output from the transmitting/receiving unit and calculate a received power of each polarized wave, an observation parameter calculation unit configured to calculate, based on the received powers, a first observation parameter having a first spatial resolution, and a second observation parameter having higher correlation with a rainfall rate than that of the first observation parameter and a second spatial resolution lower than the first spatial resolution, and a rainfall rate calculation unit configured to synthetically determine the rainfall rate based on the first observation parameter and the second observation parameter.

20 Claims, 13 Drawing Sheets

OTHER PUBLICATIONS

U.S. Appl. No. 12/700,228, filed Feb. 4, 2010, Fumihiko Mizutani et al.

V.N. Bringi et al., "Polarimetric Doppler Weather Radar", Cambridge University Press, 2001, pp. 538-539.

European Search Report issued Feb. 16, 2012 in European Application No. 10167001.6. (7 pages).

Tobias Otto et al.: "Estimation of Specific Differential Phase and Differential Backscatter Phase From Polarimetric Weather Radar Measurements of Rain". IEEE Geoscience and Remote Sensing Letters, IEEE Service Center, New York, N.Y., US, vol. 8, No. 5, Sep. 1, 2011, pp. 988-992, XP011382230, ISSN: 1545-598X, D01: 10.1109/LGRS.2011.2145354. (5 pages).

* cited by examiner

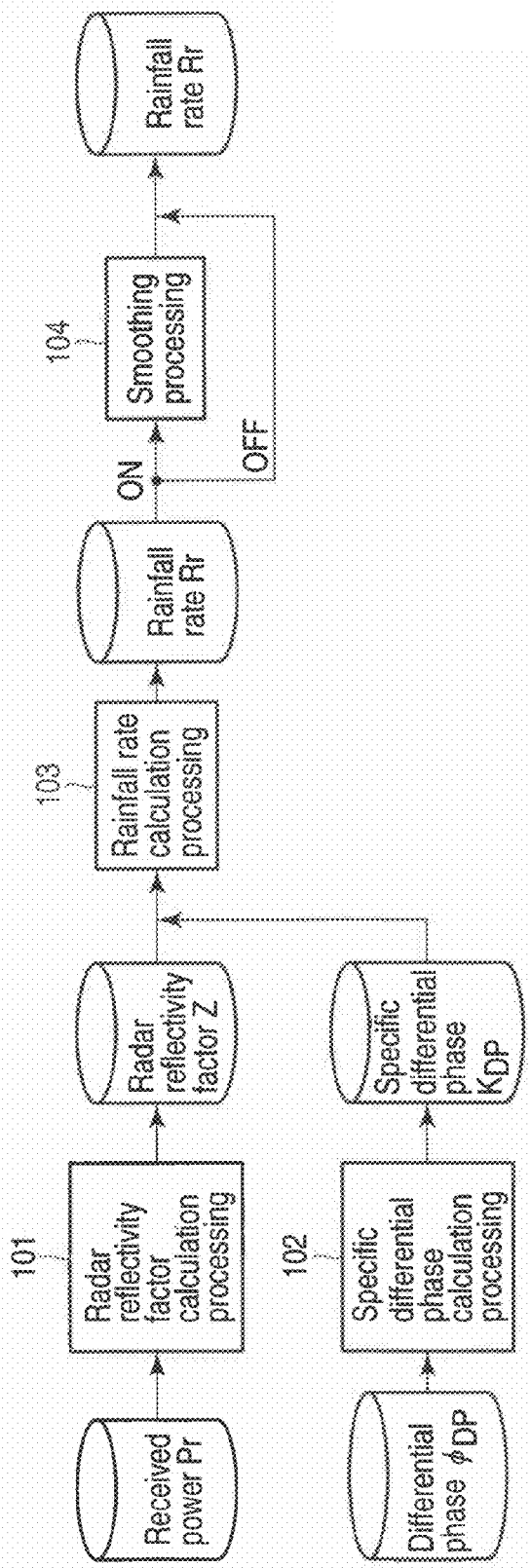
F I G. 3
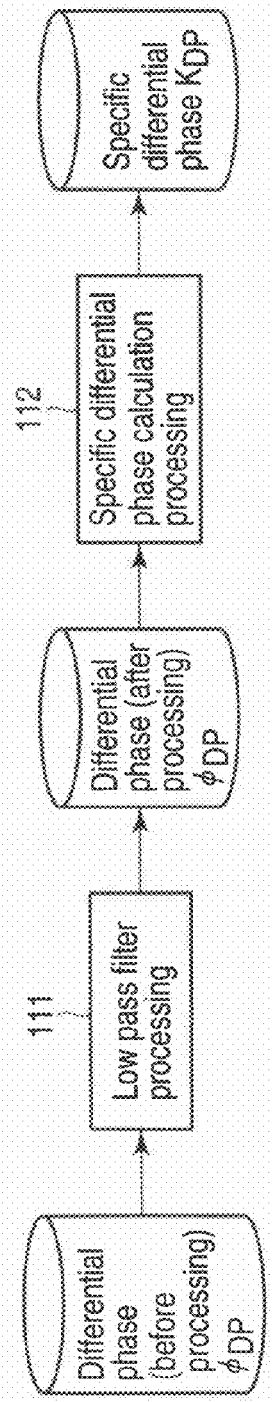
F I G. 4

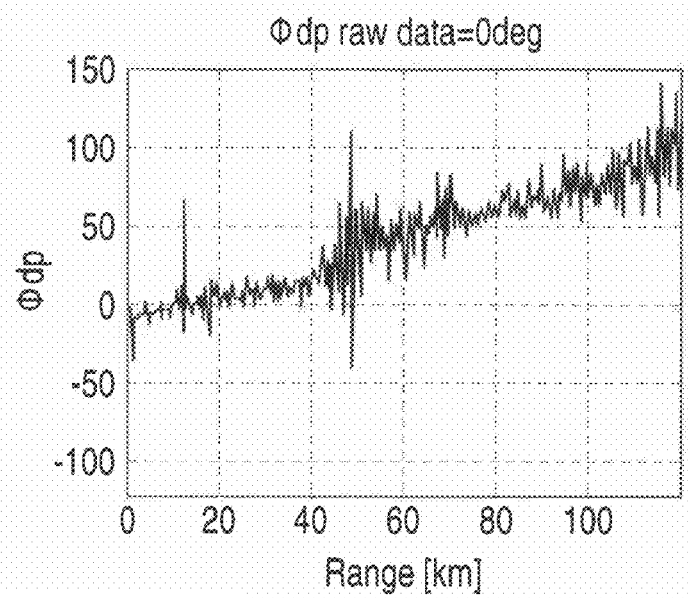
F I G. 5 A
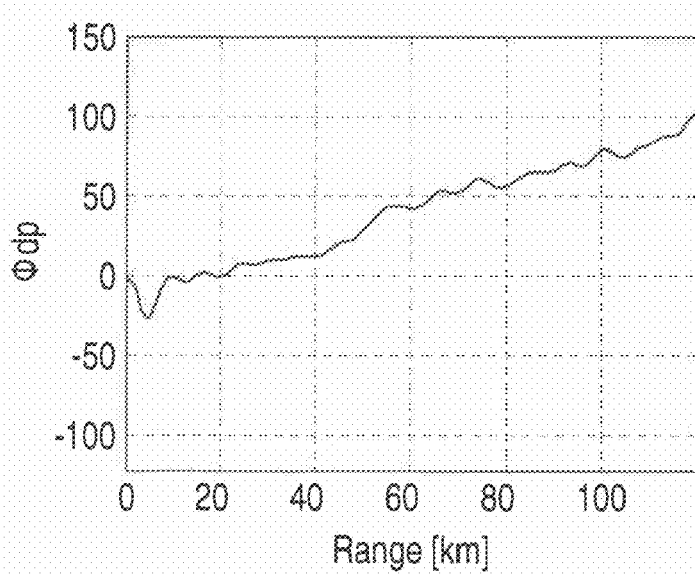
F I G. 5 B

| Z | 1.0 | 2.0 | 5.0 | 10.0 | 20.0 | 50.0 |
|---|-----|-----|-----|------|------|------|
| B | 200 | 210 | 230 | 300 | 350 | 400 |

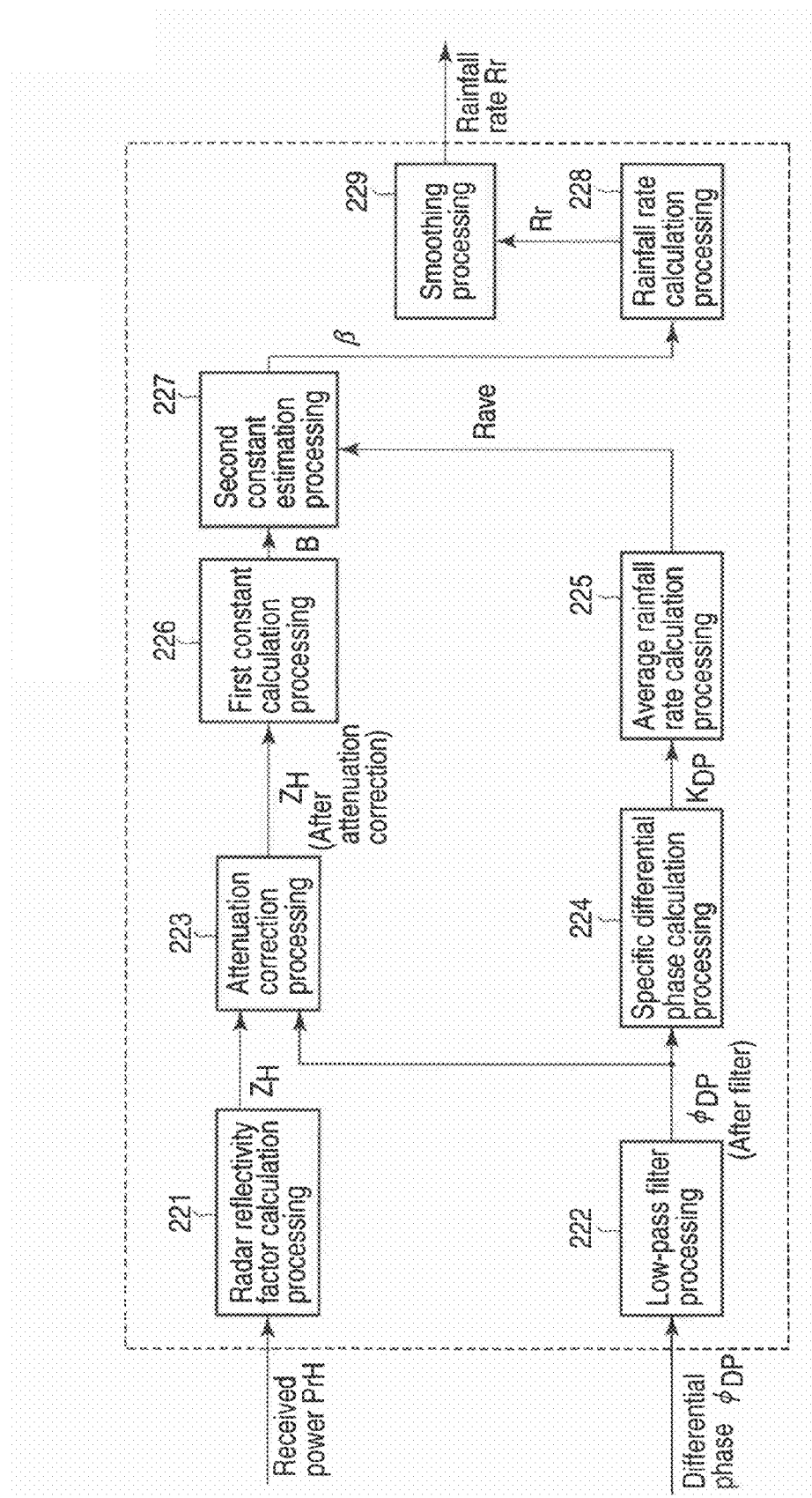
F I G. 1 3

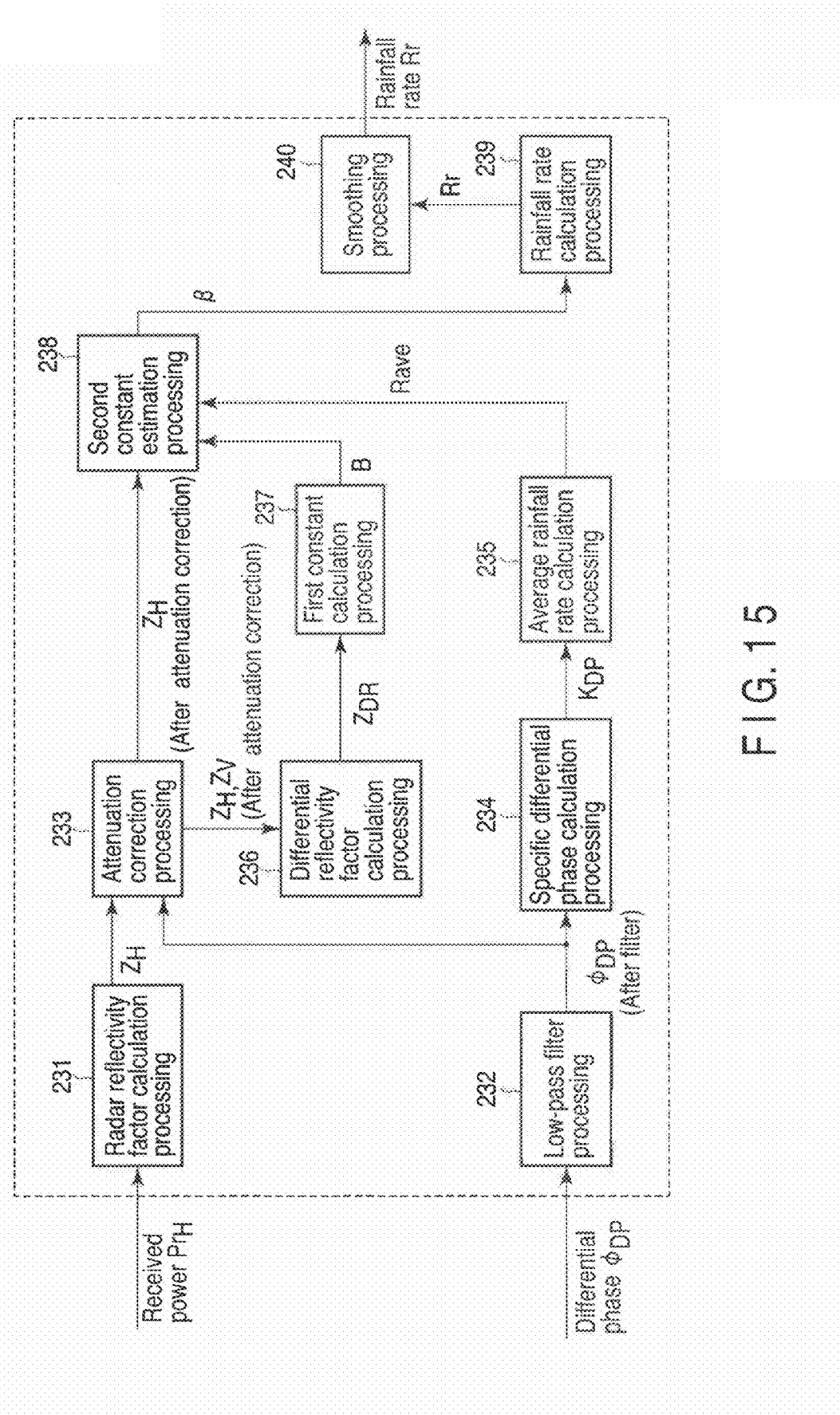
F I G. 15

WEATHER RADAR APPARATUS AND RAINFALL RATE CALCULATION METHOD

CROSS-REFERENCE TO RELATED APPLICATIONS

This application is based upon and claims the benefit of priority from Japanese Patent Applications No. 2009-173519, filed Jul. 24, 2009; No. 2009-194548, filed Aug. 25, 2009; No. 2009-195370, filed Aug. 26, 2009; No. 2009-195371, filed Aug. 26, 2009; and No. 2009-195372, filed Aug. 26, 2009; the entire contents of all of which are incorporated herein by reference.

FIELD

Embodiments described herein relate generally to a weather radar apparatus and a rainfall rate calculation method.

BACKGROUND

A conventional weather radar apparatus calculates the rainfall rate using a method based on one of observation parameters, i.e., the specific differential phase ($K_{DP}$), radar reflectivity factor (Z), and differential reflectivity factor ($Z_{DR}$). Alternatively, as disclosed in "V. N. Bringi and V. Chandrasekar, "POLARIMETRIC DOPPLER WEATHER RADAR", CAMBRIDGE UNIVERSITY PRESS, p. 538-539, 2001", rainfall rate calculation is performed by selectively using one of the three methods in accordance with the level of the predicted rainfall rate or the clutter level.

However, the specific differential phase ($K_{DP}$) can obtain only a coarse range resolution. Although the radar reflectivity factor (Z) maintains the relative relationship of the level of the rainfall rate, its absolute accuracy is low. The radar reflectivity factor (Z) and the differential reflectivity factor ($Z_{DR}$) have poor accuracy in case of radio attenuation.

BRIEF DESCRIPTION OF THE DRAWINGS

FIG. 3 is a flowchart of rainfall rate calculation processing according to the first embodiment;

FIG. 4 is a flowchart of specific differential phase calculation processing in FIG. 3;

FIG. 5A is a graph showing a differential phase before filter processing in FIG. 4;

FIG. 5B is a graph showing a differential phase after filter processing in FIG. 4;

FIG. 13 is a flowchart of rainfall rate calculation processing according to Example 2-2;

FIG. 15 is a flowchart of rainfall rate calculation processing according to Example 2-3.

DETAILED DESCRIPTION

In general, according to one embodiment, a weather radar apparatus includes a transmitting/receiving unit, a signal processing unit, an observation parameter calculation unit, and a rainfall rate calculation unit. The transmitting/receiving unit is configured to simultaneously transmit a radar wave of a horizontally polarized wave and a radar wave of a vertically polarized wave and receive reflected waves. The signal processing unit is configured to perform dual polarization observation based on a reception output from the transmitting/receiving unit and calculate a received power of each polarized wave. The observation parameter calculation unit is configured to calculate, based on the received powers, a first observation parameter having a first spatial resolution based on a beam width and a pulse width of each radar wave, and a second observation parameter having higher correlation with a rainfall rate than that of the first observation parameter and a second spatial resolution lower than the first spatial resolution. The rainfall rate calculation unit is configured to synthetically determine the rainfall rate based on the first observation parameter and the second observation parameter.

An embodiment will now be described in detail with reference to the accompanying drawing.

Figure 1:
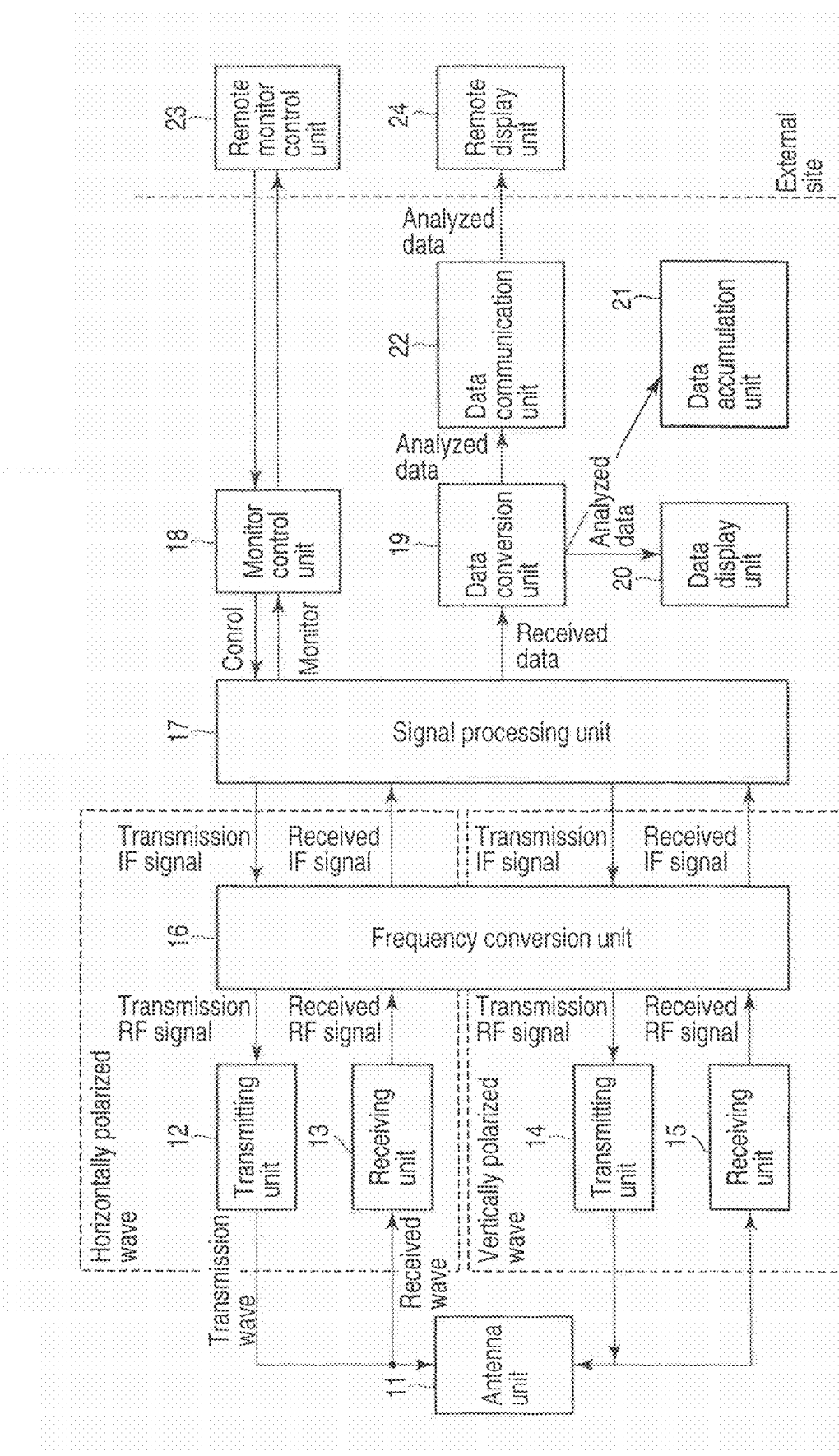
FIG. 1 is a block diagram showing a weather radar apparatus according to an embodiment.

FIG. 1 is a block diagram showing the arrangement of a weather radar apparatus having a multi-parameter radar according to this embodiment. The apparatus includes an antenna unit 11, transmitting unit (horizontal polarization) 12, receiving unit (horizontal polarization) 13, transmitting unit (vertical polarization) 14, receiving unit (vertical polarization) 15, frequency conversion unit (vertical polarization) 16, signal processing unit 17, monitor control unit 18, data conversion unit 19, data display unit 20, data accumulation unit 21, data communication unit 22, remote monitor control unit 23, and remote display unit 24.

Figure 2:
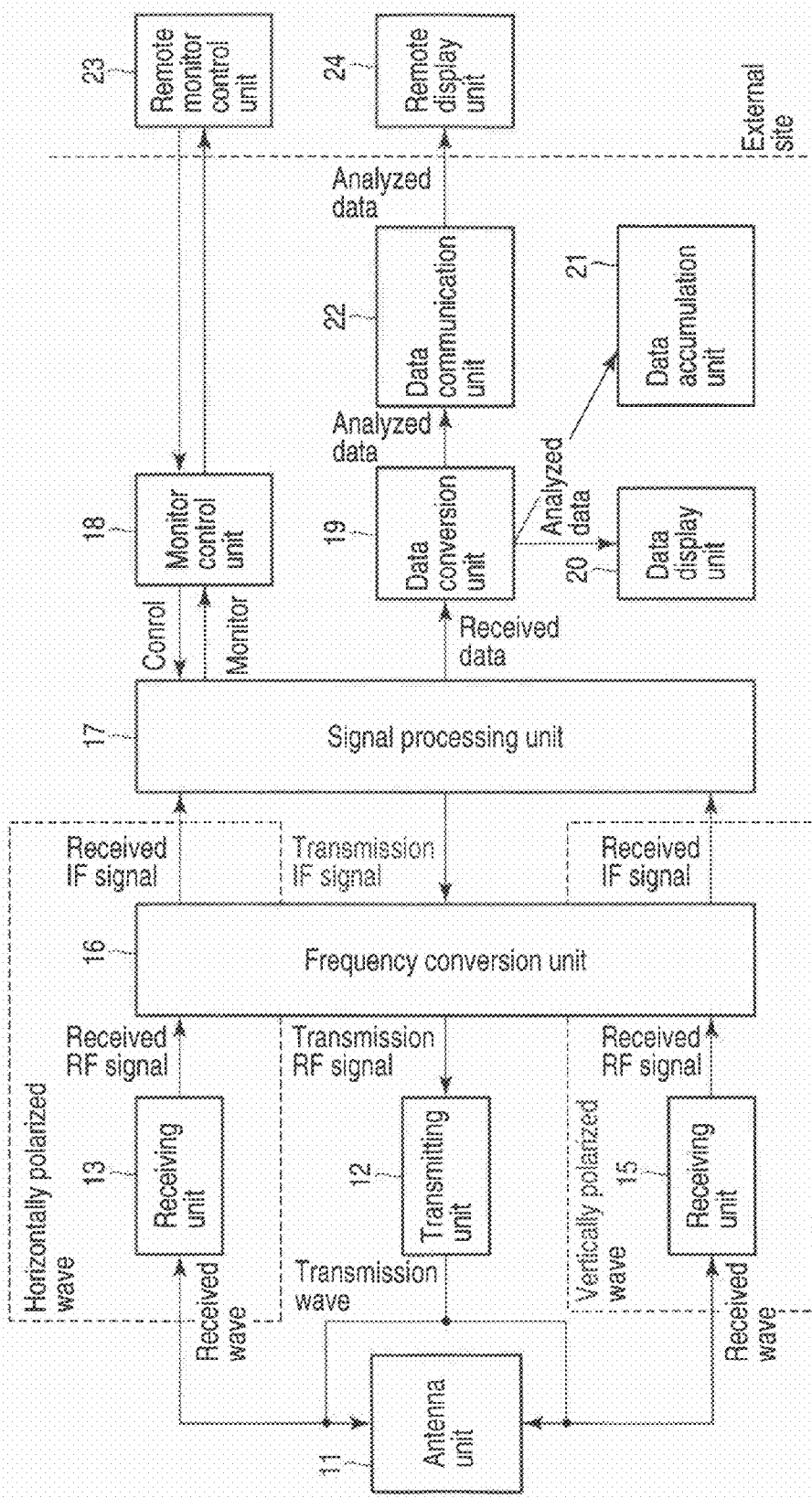
FIG. 2 is a block diagram showing another arrangement example of the weather radar apparatus.

As shown in FIG. 2, the transmitting unit 12 may be common to horizontal polarization and vertical polarization. In FIGS. 1 and 2, for example, the frequency conversion unit 16 may be separated.

Referring to FIG. 1, when a monitor control signal from the remote monitor control unit 23 is sent to the signal processing unit 17 via the monitor control unit 18, the signal processing unit 17 generates digital data of a seed signal stored inside, D/A-converts it, and sends it to the frequency conversion unit 16 as transmission IF signals of the horizontally polarized wave and vertically polarized wave. The frequency conversion unit 16 up-converts the transmission IF signals into RF signals.

The transmission RF signals of the horizontally polarized wave and vertically polarized wave obtained by the frequency conversion unit 16 are amplified by the transmitting units 12 and 14 into transmission powers observable at a long distance. The antenna unit 11 outputs the two, amplified horizontally polarized wave and vertically polarized wave into air.

Precipitation in a space reflects the horizontally polarized wave and vertically polarized wave. The antenna unit 11 captures each of the reflected waves of the horizontally polarized wave and vertically polarized wave, and the receiving units 13 and 15 receive them. The frequency conversion unit 16 converts the signals into IF signals and sends them to the signal processing unit 17.

The signal processing unit 17 A/D-converts the received IF signals of the horizontally polarized wave and vertically polarized wave, which are sent to the horizontal polarization and vertical polarization, performs I/Q detection, and calculates the received power (for each of the horizontally polarized wave and vertically polarized wave), differential phase, correlation coefficient between two polarizations, Doppler velocity, and the like.

The data conversion unit 19 calculates a plurality of observation parameters such as the specific differential phase ($K_{DP}$), radar reflectivity factor (Z), and differential reflectivity factor ($Z_{DR}$) from the received power obtained by the signal processing unit 17, and calculates the rainfall rate (R) using the plurality of observation parameters. Detailed process contents will be described later.

The data display unit 20 displays the data analyzed by the data conversion unit 19. The data accumulation unit 21 accumulates the data analyzed by the data conversion unit 19. The data communication unit 22 transfers the data analyzed by the data conversion unit 19 to the outside of the radar site via a communication means. The remote display unit 24, for example, displays or analyzes the data transferred from the radar site. The remote monitor control unit 23 can monitor the radar apparatus, like the monitor control unit 18.

Rainfall rate calculation processing by the data conversion unit 19 of the weather radar apparatus with the above-described arrangement will be explained below.

First Embodiment

FIG. 3 is a flowchart of rainfall rate calculation processing according to the first embodiment. This method is characterized by converting, in a process of calculating the rainfall rate (R) from the specific differential phase ($K_{DP}$), the specific differential phase ($K_{DP}$) calculated at a low resolution (second spatial resolution) into a high resolution based on the radar reflectivity factor (Z) calculated at a high resolution (first spatial resolution). Referring to FIG. 3, the normal calculation method complies with Fukao & Hamazu, "Radar Remote Sensing of Weather and Atmosphere", Kyoto University Press, 2005, March.

In radar reflectivity factor calculation processing 101, the radar reflectivity factor (Z) is calculated from the received power (Pr). The resolution of the radar reflectivity factor (Z) corresponds to the horizontal beam width in the azimuth direction and the pulse width in the range direction. When calculating the radar reflectivity factor (Z), the radio attenuation amount of each of the horizontally polarized wave and vertically polarized wave up to the region is estimated from the differential phase ($\phi_{DP}$) and corrected.

In specific differential phase calculation processing 102, the specific differential phase ($K_{DP}$) is calculated from the differential phase ($\phi_{DP}$). FIG. 4 is a flowchart of the specific differential phase calculation processing. For the differential phase ($\phi_{DP}$), since high-frequency components are removed as much as possible, average value of many hits in the azimuth direction are needed. Due to this influence, a predetermined number of radar hits are obtained even in the azimuth direction so that data is generated in a beam width equal to or larger than the horizontal beam width. In addition, since high-frequency components are present in the range direction, directly calculating the specific differential phase ($K_{DP}$) that is the range derivative of the differential phase ($\phi_{DP}$) yields data containing many noise components. To prevent this, in low-pass filter processing 111, the high-frequency components are removed from the differential phase ($\phi_{DP}$). FIGS. 5A and 5B show this processing. FIG. 5A shows the differential phase before filter processing, and FIG. 5B shows that after filter processing. The abscissa represents the range (r), and the ordinate represents the differential phase ($\phi_{DP}$).

When removing the high-frequency components, the resolution in the range direction lowers. Hence, the distance between two points in specific differential phase calculation processing 112 is set as the resolution in the range direction after passing through the low-pass filter. The resolution can also be set based on the distribution of the values of the differential phase ($\phi_{DP}$), radar reflectivity factor (Z), differential reflectivity factor ($Z_{DR}$), or correlation coefficient ($\rho$HV) between two polarizations. Since the high-frequency components are removed as much as possible, average value of many hits in the azimuth direction are obtained for the differential phase ($\phi_{DP}$). Due to this influence, a predetermined number of radar hits are obtained even in the azimuth direction so that data is generated in a beam width equal to or larger than the horizontal beam width. When the specific differential phase ($K_{DP}$) is calculated in this way, a value with a lower resolution in both the azimuth direction and the range direction is recorded.

More specifically, the differential phase ($\phi_{DP}$) that has passed through the low-pass filter has a lower resolution. For this reason, when the distance between two points corresponding to the difference in calculating the specific differential phase ($K_{DP}$) is set as the resolution, the specific differential phase ($K_{DP}$) corresponding to the total rainfall between the two points is obtained by $$K_{DP} = \{\phi_{DP}(r_2) - \phi_{DP}(r_1)\}/2(r_2 - r_1)$$

Figure 6:
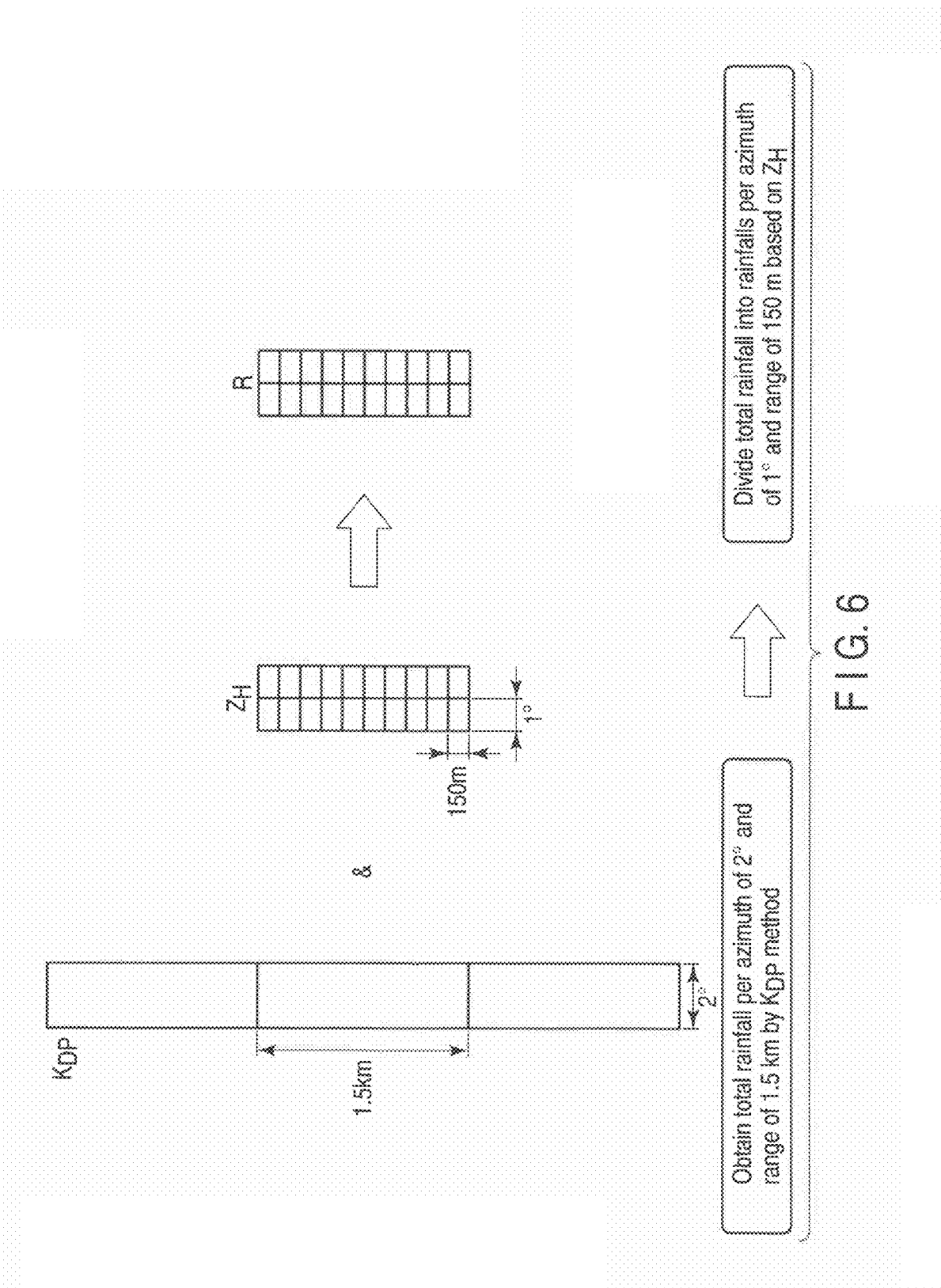
FIG. 6 is a view showing the rainfall rate calculation processing in FIG. 3.

In rainfall rate calculation processing 103, the accurate rainfall rate (R) with a high spatial resolution is calculated by combining the specific differential phase ($K_{DP}$) which has a low spatial resolution but high correlation with the rainfall rate and the radar reflectivity factor (Z) which has a high spatial resolution but low correlation with the absolute value of the rainfall rate and is represented by a relative value near the location, as shown in FIG. 6.

This will be described in detail using the example shown in FIG. 6. The total rainfall per azimuth of 2° and range of 1.5 km is obtained by the $K_{DP}$ method, and divided into rainfalls per azimuth of 1° and range of 150 m based on $Z_H$ without knowing the radar reflectivity factor. To obtain the total rainfall information, the specific differential phase ($K_{DP}$) is multiplied by the ratio of the radar reflectivity factor ($Z_H$) at each location to obtain ($K_{DP}$) at the location, and the rainfall rate (R) is calculated from ($K_{DP}$). Finally, smoothing processing 104 of the data is executed for each azimuth and range to obtain data without steps.

As described above, according to the first embodiment, the rainfall rate (R) is calculated considering all factors involved by combining the specific differential phase ($K_{DP}$) which has a low spatial resolution but high correlation with the rainfall rate and the radar reflectivity factor (Z) which has a high spatial resolution but low correlation with the absolute value of the rainfall rate and is represented by a relative value near the location. Hence, according to the above-described rainfall rate calculation method, it is possible to calculate the accurate rainfall rate (R) with a high spatial resolution.

Example 1

Figure 7:
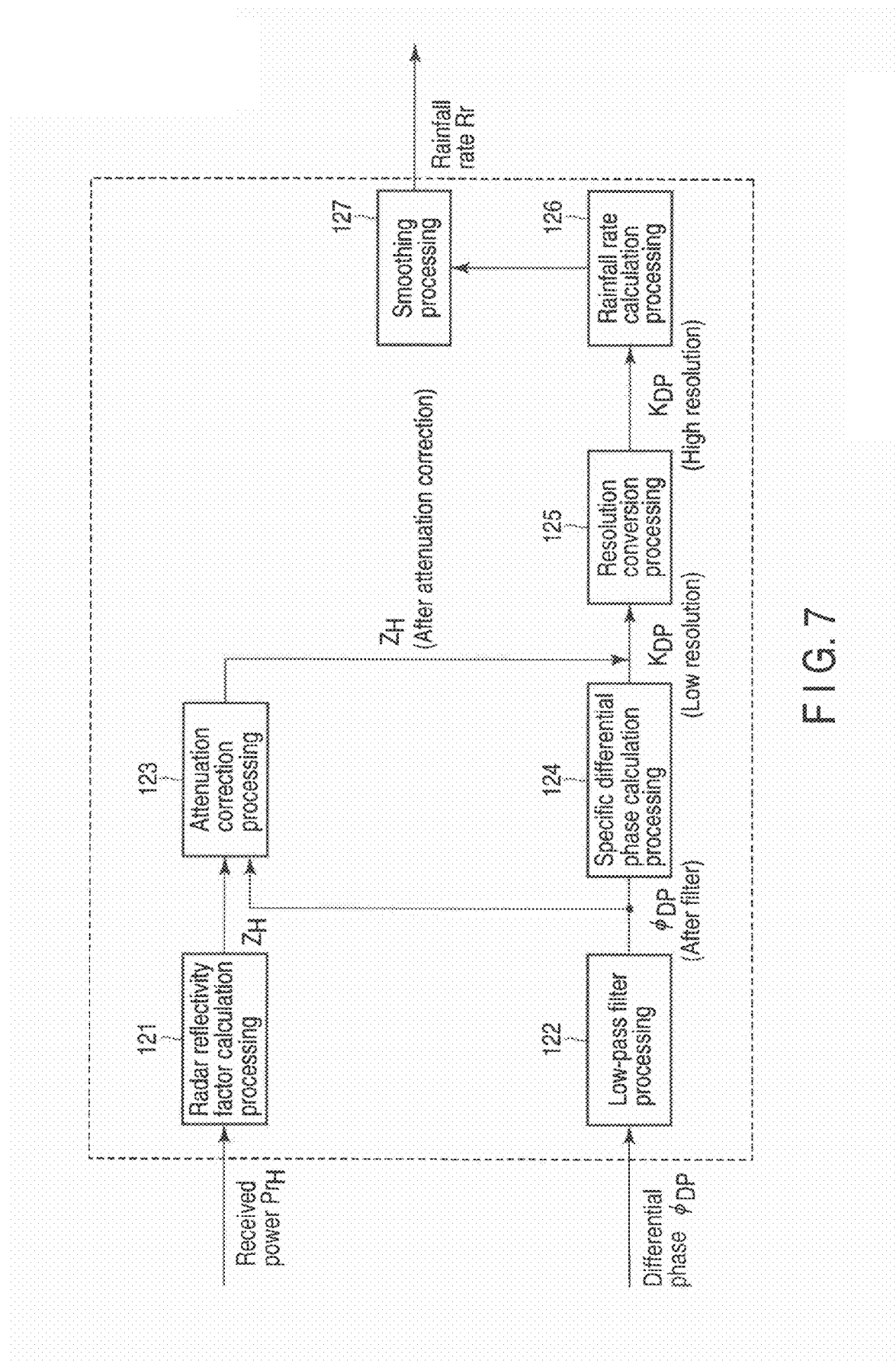
FIG. 7 is a flowchart of rainfall rate calculation processing according to Example 1.

Example 1 of the rainfall rate calculation processing according to the first embodiment will be described. FIG. 7 is a flowchart of rainfall rate calculation processing according to Example 1.

In radar reflectivity factor calculation processing 121, the radar reflectivity factor ($Z_H$) is calculated from the received power (PrH) of the horizontally polarized wave based on the radar equation. The resolution of ($Z_H$) corresponds to the horizontal beam in the azimuth direction and the pulse width in the range direction. The resolution of ($Z_H$) will be referred to as a high resolution.

In low-pass filter processing 122, the differential phase ($\phi_{DP}$) is filtered in the range direction using a low-pass filter such as IIR or FIR. For the differential phase ($\phi_{DP}$), since high-frequency components are removed as much as possible, average value of many hits in the azimuth direction are needed. Due to this influence, a predetermined number of radar hits are obtained even in the azimuth direction so that data is generated in a beam width equal to or larger than the horizontal beam width. In addition, since high-frequency components are present in the range direction, directly calculating the specific differential phase ($K_{DP}$) that is the range derivative of the differential phase ($\phi_{DP}$) yields data containing many noise components. For this reason, the high-frequency components in the range direction are removed from the differential phase ($\phi_{DP}$) by the low-pass filter processing 122, as shown in FIG. 5B.

In attenuation correction processing 123, for the radar reflectivity factor ($Z_H$), the radio attenuation amount of each of the horizontally polarized wave and vertically polarized wave up to the region is estimated from the differential phase ($\phi_{DP}$) and corrected. More specifically, the corrected radar reflectivity factor ($Z_H$) is obtained by the following equation. Letting $Z_H(r)'$ be the radar reflectivity factor at a location r before correction, the radar reflectivity factor ($Z_H$) can be calculated by $$10 \log_{10} Z_H(r) = 10 \log_{10} Z_H(r)' - \alpha(\phi_{DP}(r) - \phi_{DP}(0))$$

where $\alpha$ is a constant. As the differential phase ($\phi_{DP}$), the value after the filter processing in the low-pass filter processing 122 may be used.

In specific differential phase calculation processing 124, the range derivative of the differential phase ($\phi_{DP}$) is calculated to obtain the specific differential phase ($K_{DP}$). Let $\phi_{DP(r1)}$ and $\phi_{DP(r2)}$ be the differential phases at two locations r1 and r2 in the range direction after passing through the filter. The specific differential phase ($K_{DP}$) corresponding to the total rainfall between the two points can be calculated by $$K_{DP} = \{\phi_{DP}(r_2) - \phi_{DP}(r_1)\} / \{2(r_2 - r_1)\}$$

As shown in FIG. 5B, when removing the high-frequency components of the differential phase ($\phi_{DP}$), the resolution in the range direction lowers. Hence, the distance between the two locations r1 and r2 (L=r2−r1) is set as the resolution in the range direction after passing through the low-pass filter. The magnitude of L depends on the resolution of the low-pass filter. Since the data is generated in a beam width equal to or larger than the horizontal beam width when calculating the differential phase ($\phi_{DP}$), the resolution lowers in the azimuth direction as well. For this reason, the specific differential phase ($K_{DP}$) obtained here has a lower resolution in both the range direction and the azimuth direction. The resolution of the specific differential phase ($K_{DP}$) here will be referred to as a low resolution.

Figure 8:
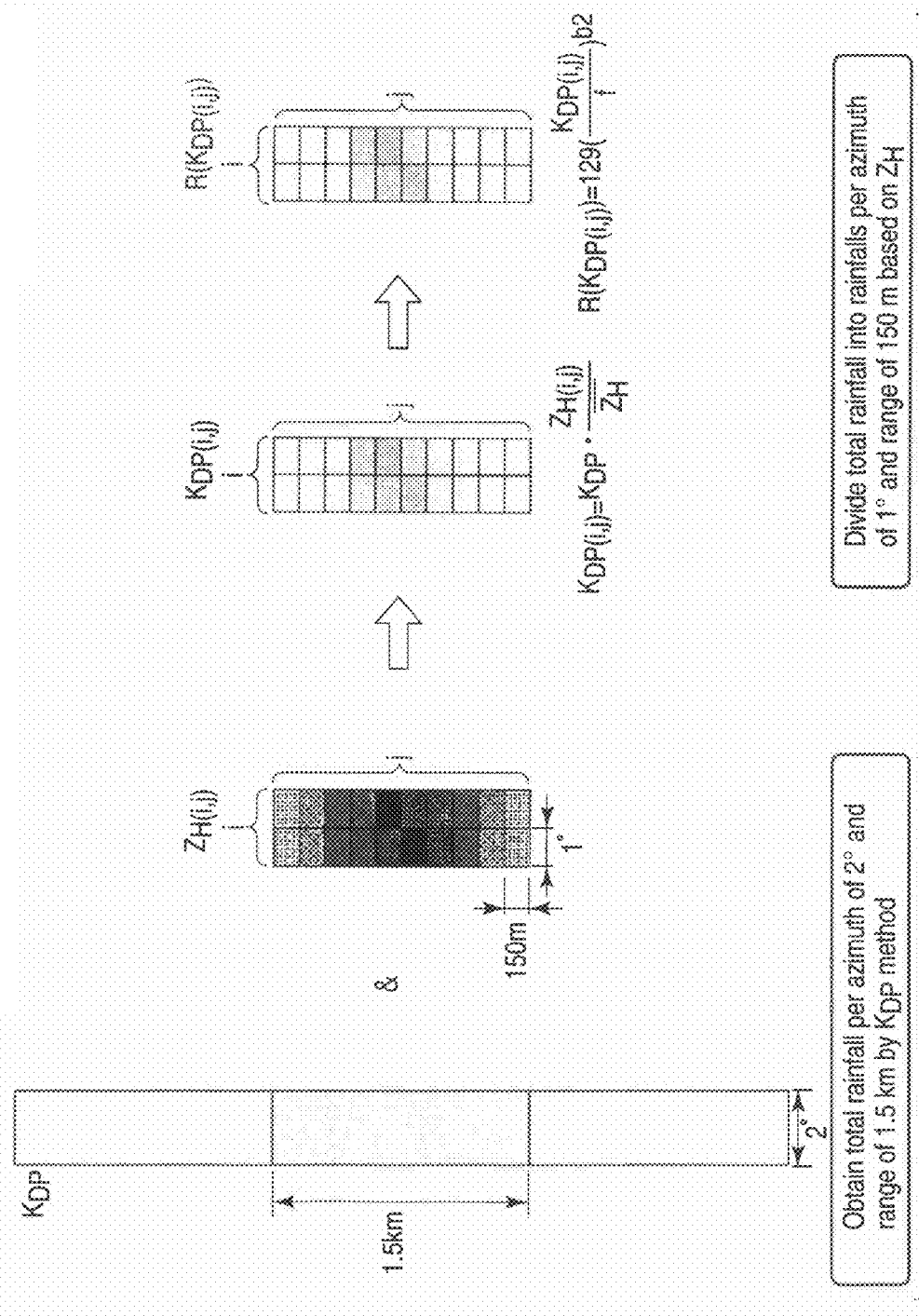
FIG. 8 is a view showing the rainfall rate calculation processing in FIG. 7.

In resolution conversion processing 125, the low-resolution specific differential phase ($K_{DP}$) is converted into a high resolution based on the radar reflectivity factor (Z). As shown in FIG. 8, the specific differential phase ($K_{DP}$) has a low spatial resolution but high correlation with the rainfall rate. On the other hand, the radar reflectivity factor (Z) has a high spatial resolution but low correlation with the absolute value of the rainfall rate and is represented by a relative value near the location. Hence, the low-resolution specific differential phase ($K_{DP}$) is converted into a high resolution based on the high-resolution radar reflectivity factor (Z). In this case, the following two conversion methods are used.

[First Conversion Method]

This will be described in detail using the example of FIG. 8. In the specific differential phase calculation processing 124, the total rainfall ($K_{DP}$) at a low resolution per azimuth of 2° and range of 1.5 km is obtained by the $K_{DP}$ method. The total rainfall is divided into rainfalls per azimuth of 1° and range of 150 m based on the high-resolution radar reflectivity factor ($Z_H$) in accordance with the equation below. Note that the mesh numbers in the high-resolution azimuth direction are defined as i=1 to m, and those in the range direction are defined as j=1 to n.

$$K_{DP}(i, j) = K_{DP} \cdot \frac{Z_H(i, j)}{\overline{Z_H}}$$

$$\overline{Z_H} = \frac{\sum_{i=1}^{m} \sum_{j=1}^{n} Z_H(i, j)}{m \times n}$$

That is, the obtained specific differential phase ($K_{DP}$) is multiplied by the ratio of the radar reflectivity factor ($Z_H(i,j)$) at each location (i,j) to obtain the specific differential phase ($K_{DP}(i,j)$) at that location.

[Second Conversion Method]

In the second conversion method, first, the temporary rainfall rate (Rz) is obtained at a high resolution per azimuth of 1° and range of 150 m based on $Z_H(i,j)$ from the radar reflectivity factor ($Z_H$). For rainfall rate calculation using the radar reflectivity factor Z, $$Z = B \times R^\beta$$

is known, where B and $\beta$ are constants. For example, N is 200, and $\beta$ is 1.6.

From the above equation, we obtain $$R(Z) = (Z/B)^{-\beta}$$

The total rainfall at a low resolution per azimuth of 2° and range of 1.5 km, which is obtained by the $K_{DP}$ method, is divided into rainfalls per azimuth of 1° and range of 150 m for $Z_H(i,j)$ based on the temporary rainfall rate (R(Z)), as indicated by $$K_{DP}(i, j) = K_{DP} \cdot \frac{(Z_H/B)^{-\beta}}{\overline{R}}$$

$$\overline{R} = \frac{\sum_{i=1}^{m} \sum_{j=1}^{n} (Z_H(i, j)/B)^{-\beta}}{m \times n}$$

That is, the obtained specific differential phase ($K_{DP}$) is multiplied by the ratio of the temporary rainfall rate (R(Z)(i, j)) at each location (i,j) to obtain the specific differential phase ($K_{DP}(i,j)$) at that location.

In rainfall rate calculation processing 126, the high-resolution rainfall rate (R($K_{DP}$)) is calculated from the high-resolution specific differential phase ($K_{DP}$) converted by the resolution conversion processing 125. More specifically, the high-resolution rainfall rate (R($K_{DP}$)) is calculated by $$R(K_{DP}(i,j)) = 129 \times (K_{DP}(i,j)/f)^{b2}$$

where f is the transmission frequency [GHz], and b2 is a constant (for example, 0.85).

In smoothing processing 127, smoothing processing of the data is performed in the azimuth direction and range direction to generate data without steps. For the smoothing, for example, the following two methods are used.

[First Smoothing Method]

Figure 9:
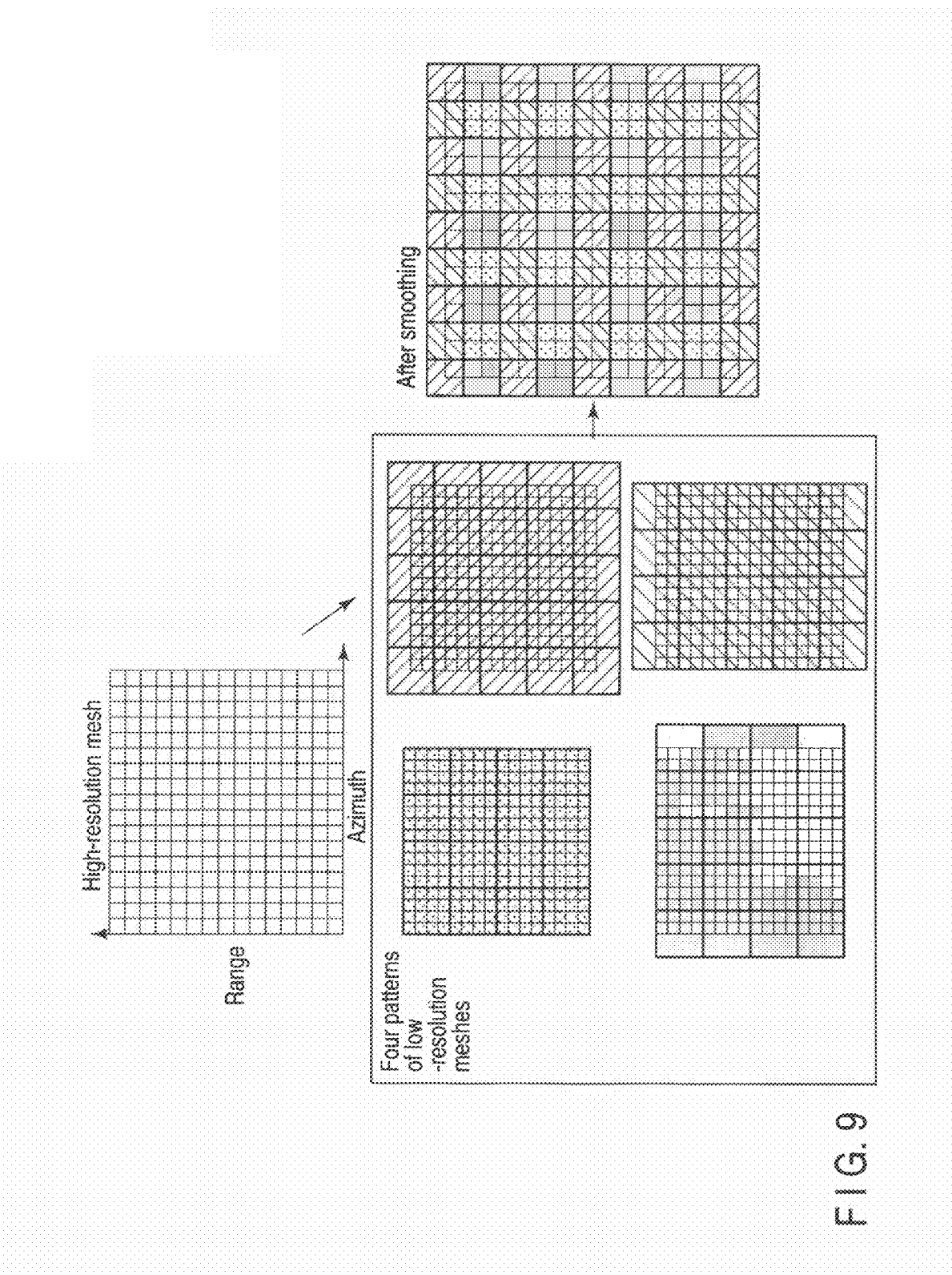
FIG. 9 is a view showing smoothing processing in FIG. 7.

In the first smoothing method, four patterns of low-resolution meshes shifted from each other in the range direction and azimuth direction are arranged on a high-resolution mesh, as shown in FIG. 9. In the specific differential phase calculation processing 124, the specific differential phase ($K_{DP}$) is obtained for each of the four patterns of low-resolution meshes, thereby calculating the high-resolution rainfall rate ($R(K_{DP})$) for each of the four patterns of specific differential phases ($K_{DP}$). In the smoothing processing 127, a value near the center of each low-resolution mesh is employed from the four patterns of high-resolution rainfall rates ($R(K_{DP})$), as shown in FIG. 9, thereby obtaining the smoothed rainfall rate ($R(K_{DP})$). Alternatively, a weighted mean may be calculated for the four patterns of overlapping meshes.

[Second Smoothing Method]

In the second smoothing method, when calculating the low-resolution specific differential phase ($K_{DP}$) by the specific differential phase calculation processing 124, a constraint is provided not to generate a predetermined difference or more relative to the specific differential phase ($K_{DP}$) of an adjacent low-resolution mesh. For example, the specific differential phase is determined within the range of ±10% of the value of the specific differential phase ($K_{DP}$) of another peripheral mesh region.

As described above, according to Example 1, the specific differential phase ($K_{DP}$) which has a low spatial resolution but high correlation with the rainfall rate is converted into a high resolution based on the radar reflectivity factor (Z) which has a high spatial resolution but low correlation with the absolute value of the rainfall rate and is represented by a relative value near the location. The rainfall rate (R) is then calculated from the specific differential phase ($K_{DP}$) converted into the high resolution. Hence, according to the above-described rainfall rate calculation method, it is possible to calculate the accurate rainfall rate (R) with a high spatial resolution.

Second Embodiment

Figure 10:
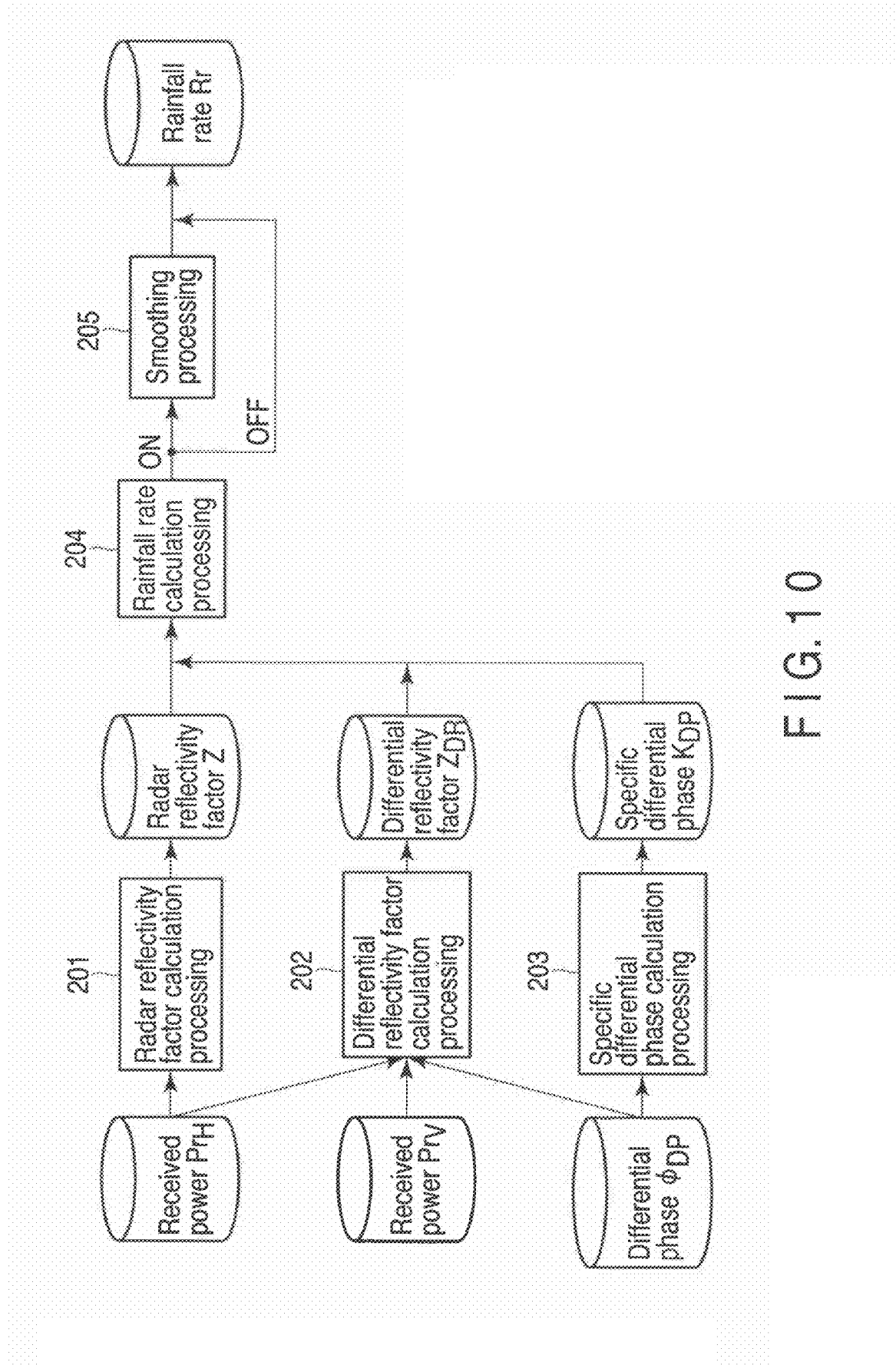
FIG. 10 is a flowchart of rainfall rate calculation processing according to the second embodiment.

FIG. 10 is a flowchart of rainfall rate calculation processing according to the second embodiment.

In radar reflectivity factor calculation processing 201, the radar reflectivity factor (Z) is obtained from the received power $Pr_H$ of a horizontally polarized wave. In differential reflectivity factor calculation processing 202, the differential reflectivity factor ($Z_{DR}$) is obtained from the received powers $Pr_H$ and $Pr_V$ of the horizontally polarized wave and vertically polarized wave and the differential phase ($\phi_{DP}$). In specific differential phase calculation processing 203, the specific differential phase ($K_{DP}$) is obtained from the differential phase ($\phi_{DP}$).

In rainfall rate calculation processing 204, the rainfall rate (Rr) is obtained from the radar reflectivity factor (Z), differential reflectivity factor ($Z_{DR}$), and specific differential phase ($K_{DP}$) obtained in the above-described processes 201 to 203. The rainfall rate (Rr) obtained here is selectively subjected to smoothing processing 205 and output.

More specifically, the method shown in FIG. 10 calculates the rainfall rate using the relationship between the radar reflectivity factor (Z) and the rainfall rate (R). A low-resolution rainfall at an azimuth angle Θ [deg] and range L [m] is calculated by $K_{DP}$. Z and $Z_{DR}$ are calculated in the same region. When calculating Z and $Z_{DR}$, the radio attenuation amount of each of the horizontally polarized wave and vertically polarized wave up to the region is estimated from $\phi_{DP}$ and corrected.

For rainfall rate calculation using the radar reflectivity factor (Z), $$Z = B \times R^\beta \quad (1)$$

is known, where B is determined by methods according to Examples 2-1 to 2-3.

Example 2-1

B of the rainfall rate calculation formula $Z = B \cdot R^\beta$ is set to B=200 or the like in advance. For B, a table may be prepared in advance in accordance with the value Z, and a value in the table may be used.

Figure 11:
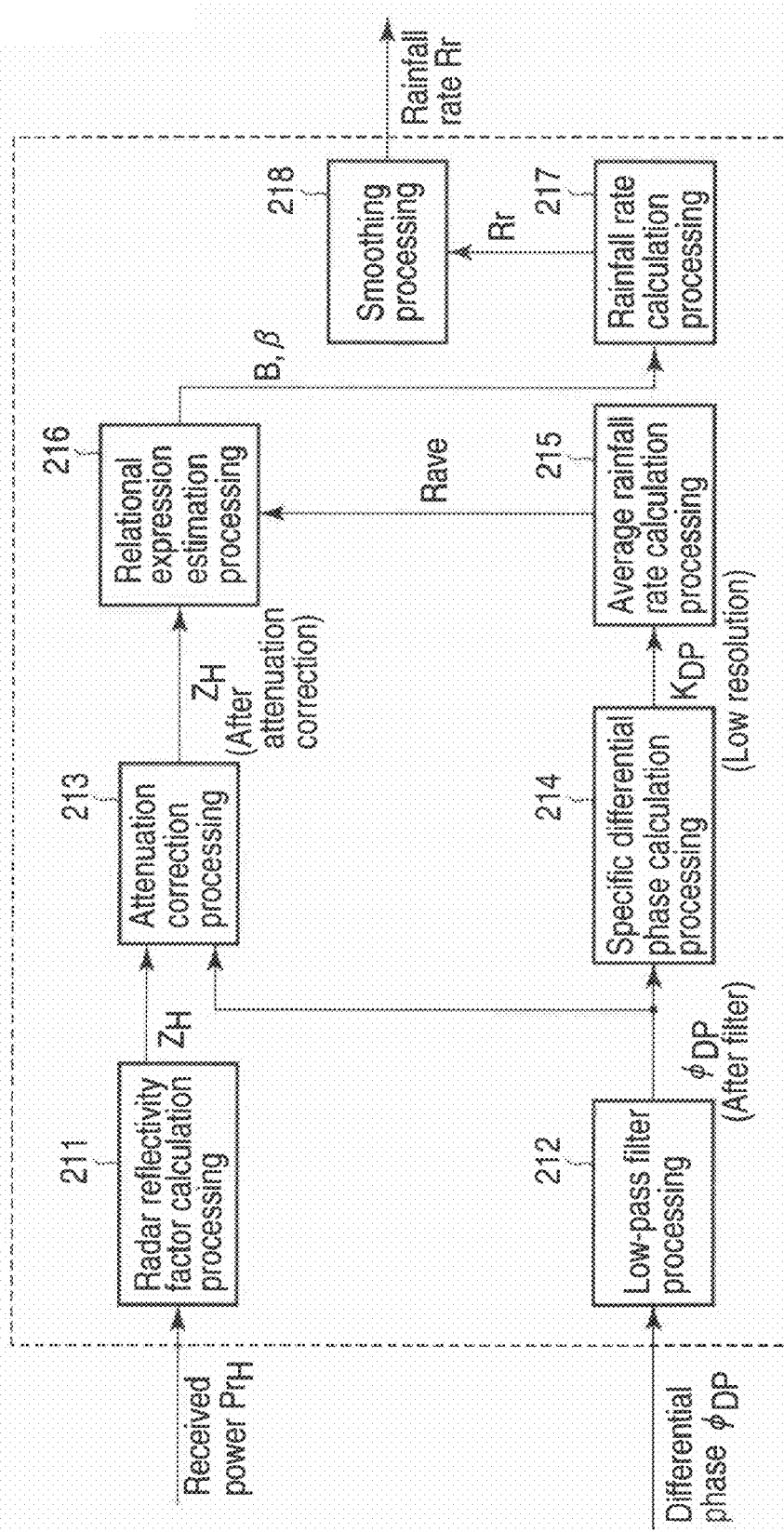
FIG. 11 is a flowchart of rainfall rate calculation processing according to Example 2-1.

FIG. 11 is a flowchart of rainfall rate calculation processing according to Example 2-1.

In radar reflectivity factor calculation processing 211, the radar reflectivity factor ($Z_H$) is calculated from the received power ($Pr_H$) of the horizontally polarized wave based on the radar equation. The resolution of the radar reflectivity factor ($Z_H$) corresponds to the horizontal beam in the azimuth direction and the pulse width in the range direction. The resolution of the radar reflectivity factor ($Z_H$) will be referred to as a high resolution (first spatial resolution).

In low-pass filter processing 212, the differential phase ($\phi_{DP}$) is filtered in the range direction using a low-pass filter such as IIR or FIR. For the differential phase ($\phi_{DP}$), since high-frequency components are removed as much as possible, average value of many hits in the azimuth direction are needed. Due to this influence, a predetermined number of radar hits are obtained even in the azimuth direction so that data is generated in a beam width equal to or larger than the horizontal beam width. In addition, since high-frequency components are present in the range direction, directly calculating the specific differential phase ($K_{DP}$) that is the range derivative of the differential phase ($\phi_{DP}$) yields data containing many noise components. For this reason, the high-frequency components in the range direction are removed from the differential phase ($\phi_{DP}$) by the low-pass filter processing 111, as shown in FIG. 5B. FIG. 4 shows this state.

In attenuation correction processing 213, for the radar reflectivity factor ($Z_H$), the radio attenuation amount of each of the horizontally polarized wave and vertically polarized wave up to the region is estimated from the differential phase ($\phi_{DP}$) and corrected. More specifically, the corrected radar reflectivity factor ($Z_H$) is obtained by the following equation. Letting $Z_H(r)'$ be the radar reflectivity factor at a location r before correction, the radar reflectivity factor ($Z_H$) can be calculated by $$10 \log_{10} Z_H(r) = 10 \log_{10} Z_H(r)' - \alpha(\phi_{DP}(r) - \phi_{DP}(0))$$

where α is a constant. As the differential phase ($\phi_{DP}$), the value after the filter processing in the low-pass filter processing 212 is used.

In specific differential phase calculation processing 214, the range derivative of the differential phase ($\phi_{DP}$) is calculated to obtain the specific differential phase ($K_{DP}$). Let $\phi_{DP(r1)}$ and $\phi_{DP(r2)}$ be the differential phases at two locations r1 and r2 in the range direction after passing through the filter. The specific differential phase ($K_{DP}$) corresponding to the total rainfall between the two points can be calculated by $$K_{DP} = \{\phi_{DP}(r_2) - \phi_{DP}(r_1)\} / \{2(r_2 - r_1)\}$$

In this case, a rainfall at the azimuth angle Θ [deg] and range L [m] is calculated by $K_{DP}$ as a rainfall with a low resolution (second spatial resolution). As shown in FIG. 5B, when removing the high-frequency components of the differential phase ($\phi_{DP}$), the resolution in the range direction lowers. Hence, the distance between the two locations r1 and r2 (L=r2−r1) is set as the resolution in the range direction after passing through the low-pass filter. The magnitude of L depends on the resolution of the low-pass filter. The resolution of the azimuth angle Θ depends on hits necessary for calculating $\phi_{DP}$.

In average rainfall rate calculation processing 215, the average rainfall rate ($R_{ave}$) in each low-resolution region is calculated based on the low-resolution specific differential phase ($K_{DP}$). More specifically, the average rainfall rate ($R_{ave}$) is calculated by $$R_{ave} = 129 \times (K_{DP}/f)^{b2}$$

where f is the transmission frequency [GHz], and b2 is a constant (for example, 0.85).

In relational expression estimation processing 216, the relational expression between the radar reflectivity factor (Z) and the rainfall rate (R) is estimated. In calculating the rainfall rate (R) using the radar reflectivity factor (Z), $$Z = B \times R^\beta \quad (1\text{-}1)$$

is known, where B and β are constants determined by the rain type or the like. To prevent an enormous calculation amount, the constant β is estimated while fixing the constant B to, for example, 200. However, both the constants B and β may be estimated.

In this case, the radar reflectivity factor (Z) is calculated at a high resolution based on the azimuth angle Θ [deg] and the range l [m]. The relationship between the high resolution and the low resolution is considered as follows.

$$\Theta = m \times \theta$$

$$L = n \times l$$

Figures 12, 14:
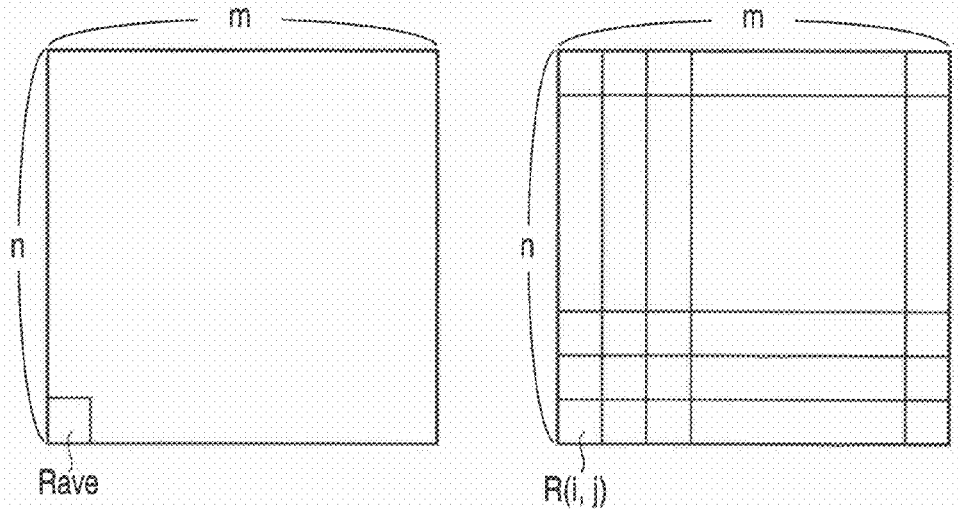
FIG. 12 is a view showing the rainfall rate calculation processing in FIG. 11.
FIG. 14 is a table showing an example of table data representing a constant B for the radar reflectivity factor.

As shown in FIG. 12, when the mesh numbers in the high-resolution azimuth direction are defined as i=1 to m, and those in the range direction are defined as j=1 to n, equation (1-1) is transformed into $$Z(i,j) = B \times R(i,j)^\beta \quad (1\text{-}2)$$

From equation (1-2), we obtain $$R(i,j) = (Z(i,j)/B)^{-\beta} \quad (1\text{-}3)$$

In equation (1-3), when the total rainfall in the region of the azimuth angle Θ [deg] and range L [m] is assumed to remain the same independently of the resolution, $$m \times n \times R_{ave} = \sum_{i=1}^{m} \sum_{j=1}^{n} R(i,j) \quad (1\text{-}4)$$

holds.

The constant β is analytically estimated from equations (1-2) and (1-4). Note that in calculating the constant β, smoothing processing may be performed based on a constraint that, for example, the constant β is determined within the range of ±10% of the value β in an adjacent low-resolution region.

In rainfall rate calculation processing 217, the high-resolution rainfall rate (R(i,j)) is calculated based on equation (1-3) using the constant β estimated in the low-resolution region and the radar reflectivity factor (Z(i,j)) calculated in the high-resolution region. The constant B is the same as that in estimating β.

In smoothing processing 218, data smoothing processing in the azimuth direction and range direction is performed to obtain data without steps. As the smoothing method, for example, the two methods of Example 1-1 are usable.

As described above, in Example 2-1, based on the average rainfall rate ($R_{ave}$) obtained from the specific differential phase ($K_{DP}$) which has a low spatial resolution but high correlation with the rainfall rate and the radar reflectivity factor (Z) which has a high spatial resolution but low correlation with the absolute value of the rainfall rate and is represented by a relative value near the location, the relational expression between the radar reflectivity factor (Z) and the rainfall rate (R) is estimated. The high-resolution rainfall rate (R(i,j)) is calculated using the relational expression. Hence, according to the above-described rainfall rate calculation method, it is possible to calculate the accurate rainfall rate with a high spatial resolution.

Example 2-2

The method of Example 2-2 determines B from Z. B is determined by B=a×Z, where a is a constant. The resolution in obtaining B can be either the resolution of $K_{DP}$ or the original resolution of Z.

FIG. 13 is a flowchart of rainfall rate calculation processing according to Example 2-2. Note that processes 221 to 225 are the same as the processes 211 to 215 of Example 2-1, and a detailed description thereof will not be repeated.

In first constant calculation processing 226, the constant B (first constant) that forms the relational expression between the radar reflectivity factor (Z) and the rainfall rate (R) is calculated. In calculating the rainfall rate (R) using the radar reflectivity factor (Z), $$Z = B \times R^\beta \quad (2\text{-}1)$$

is known, where B and β are constants determined by the rain type or the like.

In this case, the constant B is determined by the following two methods using the low-resolution radar reflectivity factor (Z). Note that the low-resolution radar reflectivity factor (Z) is obtained by employing, for example, a value obtained by averaging, in a low-resolution region, the radar reflectivity factors ($Z_H$) calculated at a high resolution and having undergone attenuation correction, or a value near the center in the low-resolution region.

[First B Calculation Processing]

The constant B is represented by, for example, $$B = a \times Z \quad (2\text{-}2)$$

or $$B = a \times Z + b \quad (2\text{-}3)$$

where a and b are empirically obtained constants. Based on equation (2-2) or (2-3), the constant B can be obtained from the low-resolution radar reflectivity factor ($Z_H$).

In the above-described method, a constraint that the constant B falls within the range of ±10% of B of an adjacent low-resolution mesh may be provided.

[Second B Calculation Processing]

As shown in FIG. 14, table data representing the constant B corresponding to the radar reflectivity factor (Z) is created in advance. The constant B may be obtained from the low-resolution radar reflectivity factor (Z) using the table data.

In second constant estimation processing 227, the constant β that forms the relational expression between the radar reflectivity factor (Z) and the rainfall rate (R) is estimated.

In this case, the radar reflectivity factor (Z) is calculated at a high resolution based on the azimuth angle θ [deg] and the range l [m]. The relationship between the high resolution and the low resolution is considered as follows.

$$\Theta = m \times \theta \quad (2\text{-}2)$$

$$L = n \times l \quad (2\text{-}3)$$

As shown in FIG. 12 described above, when the mesh numbers in the high-resolution azimuth direction are defined as i=1 to m, and those in the range direction are defined as j=1 to n, equation (2-1) is transformed into $$Z(i,j) = B \times R(i,j)^\beta \quad (2\text{-}4)$$

From equation (2-4), we obtain $$R(i,j) = (Z(i,j)/B)^{-\beta} \quad (2\text{-}5)$$

When the total rainfall in the region of the azimuth angle Θ [deg] and range L [m] is assumed to remain the same independently of the resolution, $$m \times n \times R_{ave} = \sum_{i=1}^{m} \sum_{j=1}^{n} R(i,j) \quad (2\text{-}6)$$

holds.

The constant β is analytically estimated from equations (2-4) and (2-6). Note that in calculating the constant β, smoothing processing may be performed based on a constraint that, for example, the constant β is determined within the range of ±10% of the value β in an adjacent low-resolution region.

In rainfall rate calculation processing 228, the high-resolution rainfall rate R(i,j) is calculated based on equation (2-3) using the low-resolution constant B calculated in the first constant calculation processing 226, the low-resolution constant β estimated in the second constant estimation processing 227, and the high-resolution radar reflectivity factor (Z(i, j)) corrected in the attenuation correction processing 223.

In smoothing processing 229, data smoothing processing in the azimuth direction and range direction is performed to obtain data without steps. As the smoothing method, for example, the two methods of Example 1-1 are usable.

As described above, in Example 2-2, the average rainfall rate ($R_{ave}$) obtained from the specific differential phase ($K_{DP}$) which has a low spatial resolution but high correlation with the rainfall rate and the radar reflectivity factor (Z) which has a high spatial resolution but low correlation with the absolute value of the rainfall rate and is represented by a relative value near the location are obtained. The constant B that forms the relational expression between the radar reflectivity factor (Z) and the rainfall rate (R) is calculated from the radar reflectivity factor (Z). The constant β of the relational expression is estimated from the average rainfall rate ($R_{ave}$). The high-resolution rainfall rate (R(i,j)) is calculated using the relational expression. Hence, according to the above-described rainfall rate calculation method, it is possible to calculate the accurate rainfall rate with a high spatial resolution.

Example 2-3

The method of Example 2-3 determines B from $Z_{DR}$. B is determined by $B = a \times Z_{DR}$, where a is a constant. The resolution in obtaining B can be either the resolution of $K_{DP}$ or the original resolution of $Z_{DR}$.

The radar reflectivity factor (Z) is calculated at a high resolution based on the azimuth angle θ [deg] and the range l [m]. The relationship between the high resolution and the low resolution is considered as follows.

$$\Theta = m \times \theta \quad (3)$$

$$L = n \times l \quad (4)$$

When the mesh numbers in the high-resolution azimuth direction are defined as i=1 to m, and those in the range direction are defined as j=1 to n, equation (1) is transformed into $$Z_{i,j} = B \times R_{i,j}^\beta \quad (5)$$

The total rainfall in the region of the azimuth angle Θ [deg] and range L [m] is assumed to remain the same independently of the resolution. If the average rainfall rate in a predetermined region is represented by Rave, $$m \times n \times R_{ave} = \Sigma R_{i,j} \quad (6)$$

holds. The constant β is analytically estimated from equations (5) and (6). The resolution in obtaining β can be either the resolution (low resolution) of $K_{DP}$ or the original resolution (high resolution) of Z or $Z_{DR}$.

The values m and n can be determined from the filtering resolution in calculating $K_{DP}$ or by analytically solving simultaneous equations by defining m and n as parameters on the same line as β.

Based on the constants B and β estimated finally, the high-resolution rainfall rate $R_{i,j}$ is calculated.

FIG. 15 is a flowchart of rainfall rate calculation processing according to Example 2-3. Note that processes 231 to 235 are the same as the processes 211 to 215 of Example 2-1, and a detailed description thereof will not be repeated.

In differential reflectivity factor calculation processing 236, the differential reflectivity factor ($Z_{DR}$) defined by the ratio of the radar reflectivity factor ($Z_H$) of the horizontally polarized wave and the radar reflectivity factor ($Z_V$) of the vertically polarized wave is calculated at a low resolution. Note that the low-resolution differential reflectivity factor ($Z_{DR}$) is obtained by employing, for example, a value obtained by averaging, in a low-resolution region, the radar reflectivity factors ($Z_H$ and $Z_V$) calculated at a high resolution and having undergone attenuation correction, or a value near the center in the low-resolution region.

In first constant calculation processing 237, the constant B (first constant) that forms the relational expression between the radar reflectivity factor ($Z_H$) of the horizontally polarized wave and the rainfall rate (R) is calculated. In calculating the rainfall rate (R) using the radar reflectivity factor ($Z_H$) of the horizontally polarized wave, $$Z_H = B \times R^\beta \quad (3\text{-}1)$$

is known, where B and β are constants determined by the rain type or the like.

In this case, the constant B is determined by the following method using the differential reflectivity factor ($Z_{DR}$) calculated in the differential reflectivity factor calculation processing 236.

The constant B is represented by, for example, $$B = a \times Z_{DR} \quad (3\text{-}2)$$

or $$B = a \times Z_{DR} + b \quad (3\text{-}3)$$

where a and b are empirically obtained constants. Based on equation (3-2) or (3-3), the constant B can be obtained from the low-resolution differential reflectivity factor ($Z_{DR}$).

In the above-described method, a constraint that the constant B falls within the range of ±10% of B of an adjacent low-resolution mesh may be provided.

In second constant estimation processing 238, the constant β that forms the relational expression between the radar reflectivity factor ($Z_H$) of the horizontally polarized wave and the rainfall rate (R) is estimated.

In this case, the radar reflectivity factor (Z) is calculated at a high resolution based on the azimuth angle θ [deg] and the range l [m]. The relationship between the high resolution and the low resolution is considered as follows.

$$\Theta = m \times \theta$$

$$L = n \times l$$

As shown in FIG. 12 described above, when the mesh numbers in the high-resolution azimuth direction are defined as i=1 to m, and those in the range direction are defined as j=1 to n, equation (3-1) is transformed into $$Z_H(i,j) = B \times R(i,j)^\beta \quad (3\text{-}4)$$

From equation (3-2), we obtain $$R(i,j) = (Z_H(i,j)/B)^{-\beta} \quad (3\text{-}5)$$

When the total rainfall in the region of the azimuth angle [deg] and range L [m] is assumed to remain the same independently of the resolution, $$m \times n \times R_{ave} = \sum_{i=1}^{m} \sum_{j=1}^{n} R(i,j) \quad (3\text{-}6)$$

holds.

The constant β is analytically estimated from equations (3-4) and (3-6). Note that in calculating the constant β, smoothing processing may be performed based on a constraint that, for example, the constant β is determined within the range of ±10% of the value β in an adjacent low-resolution region.

In rainfall rate calculation processing 239, the high-resolution rainfall rate R(i,j) is calculated based on equation (3-3) using the low-resolution constant B calculated in the first constant calculation processing 237, the low-resolution constant β estimated in the second constant estimation processing 238, and the radar reflectivity factor ($Z_H$(i,j)) of the horizontally polarized wave corrected in the attenuation correction processing 233.

In smoothing processing 240, data smoothing processing in the azimuth direction and range direction is performed to obtain data without steps. As the smoothing method, for example, the two methods of Example 1-1 are usable.

As described above, in Example 2-3, the average rainfall rate ($R_{ave}$) obtained from the specific differential phase ($K_{DP}$) which has a low spatial resolution but high correlation with the rainfall rate, the radar reflectivity factors ($Z_H$ and $Z_V$) each of which has a high spatial resolution but low correlation with the absolute value of the rainfall rate and is represented by a relative value near the location, and the differential reflectivity factor ($Z_{DR}$) are obtained. The constant B that forms the relational expression between the radar reflectivity factor ($Z_H$) and the rainfall rate (R) is calculated from the differential reflectivity factor ($Z_{DR}$). The constant β of the relational expression is estimated from the average rainfall rate ($R_{ave}$). The high-resolution rainfall rate (R(i,j)) is calculated using the relational expression. Hence, according to the above-described rainfall rate calculation method, it is possible to calculate the accurate rainfall rate with a high spatial resolution.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A weather radar apparatus comprising:
a transmitting/receiving unit configured to simultaneously transmit a radar wave of a horizontally polarized wave and a radar wave of a vertically polarized wave and receive reflected waves;
a signal processing unit configured to perform dual polarization observation based on a reception output from the transmitting/receiving unit and calculate a received power of each polarized wave;
an observation parameter calculation unit configured to calculate, based on the received powers, a first observation parameter having a first spatial resolution based on a beam width and a pulse width of each radar wave, and a second observation parameter having higher correlation with a rainfall rate than that of the first observation parameter and a second spatial resolution lower than the first spatial resolution; and
a rainfall rate calculation unit configured to synthetically determine the rainfall rate based on the first observation parameter and the second observation parameter.

2. The apparatus according to claim 1, wherein
the observation parameter calculation unit calculates a radar reflectivity factor ($Z_H$) of the horizontally polarized wave as the first observation parameter, and calculates a specific differential phase ($K_{DP}$) based on a differential phase ($\phi_{DP}$) of the received power as the second observation parameter, and
the rainfall rate calculation unit converts the specific differential phase ($K_{DP}$) into the first spatial resolution based on the radar reflectivity factor (Z), and calculates a rainfall rate (R($K_{DP}$) [mm/h]) of the first spatial resolution from the converted specific differential phase ($K_{DP}$).

3. The apparatus according to claim 2, wherein in the conversion, the specific differential phase ($K_{DP}$) is converted into the first spatial resolution based on a temporary rainfall rate (R(Z) [mm/h]) obtained from the radar reflectivity factor (Z).

4. The apparatus according to claim 2, further comprising a filter unit configured to remove a high-frequency component of the differential phase ($\phi_{DP}$).

5. The apparatus according to claim 2, further comprising a correction unit configured to correct an attenuation amount of the radar reflectivity factor (Z) with respect to a range using the differential phase ($\phi_{DP}$).

6. The apparatus according to claim 2, further comprising a smoothing unit configured to smooth the rainfall rate (R($K_{DP}$) [mm/h]) in an azimuth direction and range direction.

7. The apparatus according to claim 1, wherein
the observation parameter calculation unit calculates a radar reflectivity factor ($Z_H$) of the horizontally polarized wave as the first observation parameter, and calculates, as the second observation parameter, a specific differential phase ($K_{DP}$) based on a differential phase ($\phi_{DP}$) of the received power, and an average rainfall rate ($R_{ave}$ [mm/h]) in each region of the second spatial resolution based on the specific differential phase ($K_{DP}$), and
the rainfall rate calculation unit estimates a relational expression between the radar reflectivity factor (Z) and a rainfall rate (R [mm/h]) based on the average rainfall rate ($R_{ave}$ [mm/h]) and the radar reflectivity factor (Z), and calculates a rainfall rate (R [mm/h]) of the first spatial resolution using the estimated relational expression.

8. The apparatus according to claim 7, further comprising a filter unit configured to remove a high-frequency component of the differential phase ($\phi_{DP}$).

9. The apparatus according to claim 7, further comprising a correction unit configured to correct an attenuation amount of the radar reflectivity factor (Z) with respect to a range using the differential phase ($\phi_{DP}$).

10. The apparatus according to claim 7, further comprising a smoothing unit configured to smooth the rainfall rate ($R(K_{DP})$ [mm/h]) in an azimuth direction and range direction.

11. The apparatus according to claim 1, wherein
the observation parameter calculation unit calculates a radar reflectivity factor ($Z_H$) of the horizontally polarized wave as the first observation parameter, and calculates, as the second observation parameter, a specific differential phase ($K_{DP}$) based on a differential phase ($\phi_{DP}$) of the received power and an average rainfall rate ($R_{ave}$ [mm/h]) in each region of the second spatial resolution based on the specific differential phase ($K_{DP}$), and
when a relationship between the radar reflectivity factor (Z) and a rainfall rate (R [mm/h]) is represented by $$Z = B \times R^\beta (B \text{ and } \beta \text{ are constants})$$

the rainfall rate calculation unit calculates the first constant (B) based on the radar reflectivity factor (Z), estimates the second constant ($\beta$) included in the relational expression based on the first constant (B), the average rainfall rate ($R_{ave}$ [mm/h]), and the radar reflectivity factor (Z), and calculates the rainfall rate (R [mm/h]) of the first spatial resolution using the relational expression based on the first constant (B), the second constant ($\beta$), and the radar reflectivity factor (Z).

12. The apparatus according to claim 11, wherein the first constant is calculated based on table data which represents the radar reflectivity factor (Z) and the first constant (B) in correspondence with each other.

13. The apparatus according to claim 11, further comprising a filter unit configured to remove a high-frequency component of the differential phase ($\phi_{DP}$).

14. The apparatus according to claim 11, further comprising a correction unit configured to correct an attenuation amount of the radar reflectivity factor (Z) with respect to a range using the differential phase ($\phi_{DP}$).

15. The apparatus according to claim 11, further comprising a smoothing unit configured to smooth the rainfall rate ($R(K_{DP})$ [mm/h]) in an azimuth direction and range direction.

16. The apparatus according to claim 1, wherein
the observation parameter calculation unit calculates, as the first observation parameter, a radar reflectivity factor ($Z_H$) of the horizontally polarized wave, a radar reflectivity factor ($Z_V$) of the vertically polarized wave, and a differential reflectivity factor ($Z_{DR}$) based on the radar reflectivity factor ($Z_H$) of the horizontally polarized wave and the radar reflectivity factor ($Z_V$) of the vertically polarized wave, and calculates, as the second observation parameter, a specific differential phase ($K_{DP}$) based on a differential phase ($\phi_{DP}$) of the received power and an average rainfall rate ($R_{ave}$ [mm/h]) in each region of the second spatial resolution based on the specific differential phase ($K_{DP}$), and
when a relationship between the radar reflectivity factor ($Z_H$) of the horizontally polarized wave and a rainfall rate (R [mm/h]) is represented by $$Z_H = B \times R^\beta (B \text{ and } \beta \text{ are constants})$$

the rainfall rate calculation unit calculates the first constant (B) based on the differential reflectivity factor ($Z_{DR}$), estimates the second constant ($\beta$) included in the relational expression based on the first constant (B), the average rainfall rate ($R_{ave}$ [mm/h]), and the radar reflectivity factor ($Z_H$) of the horizontally polarized wave, and calculates the rainfall rate (R [mm/h]) of the first spatial resolution using the relational expression based on the first constant (B), the second constant ($\beta$), and the radar reflectivity factor ($Z_H$) of the horizontally polarized wave.

17. The apparatus according to claim 16, further comprising a filter unit configured to remove a high-frequency component of the differential phase ($\phi_{DP}$).

18. The apparatus according to claim 16, further comprising a correction unit configured to correct an attenuation amount of the radar reflectivity factor (Z) with respect to a range using the differential phase ($\phi_{DP}$).

19. The apparatus according to claim 16, further comprising a smoothing unit configured to smooth the rainfall rate ($R(K_{DP})$ [mm/h]) in an azimuth direction and range direction.

20. A rainfall rate calculation method used in a weather radar apparatus which simultaneously transmits a radar wave of a horizontally polarized wave and a radar wave of a vertically polarized wave and receives reflected waves, comprising:
performing dual polarization observation based on a reception output of the reflected waves and calculating a received power of each polarized wave;
calculating, based on the received powers, a first observation parameter having a first spatial resolution based on a beam width and a pulse width of each radar wave, and a second observation parameter having higher correlation with a rainfall rate than that of the first observation parameter and a second spatial resolution lower than the first spatial resolution; and
synthetically calculating the rainfall rate based on the first observation parameter and the second observation parameter.

* * * * *